Nov. 19, 1940.　　　C. GORDON　　　2,222,337
RAIL WHEEL CONSTRUCTION
Filed April 1, 1937
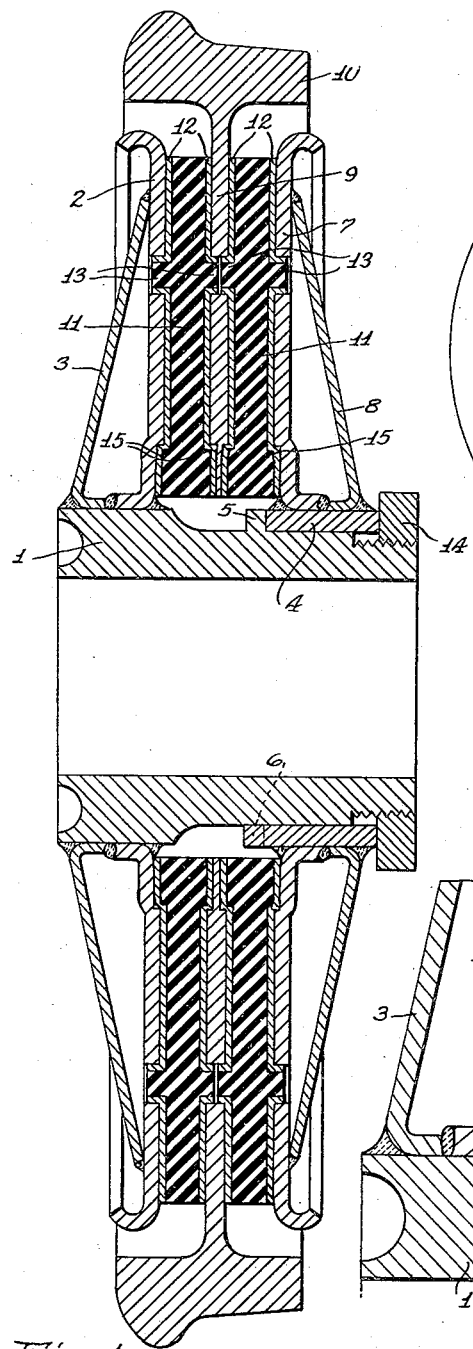
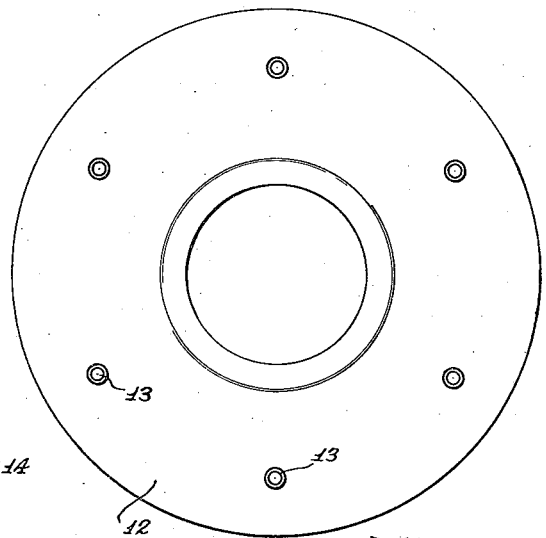
Fig. 2.
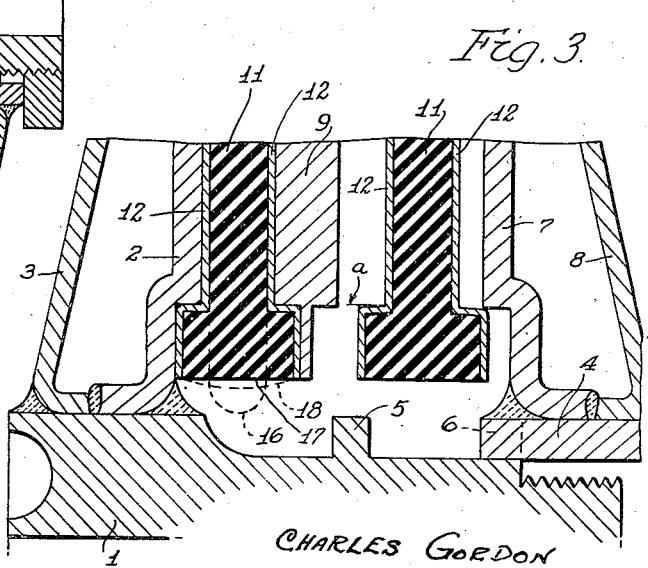
Fig. 3.
Fig. 1.
CHARLES GORDON
INVENTOR.
BY
ATTORNEY.

Patented Nov. 19, 1940

2,222,337

UNITED STATES PATENT OFFICE 2,222,337

RAIL WHEEL CONSTRUCTION

Charles Gordon, New York, N. Y., assignor to Transit Research Corporation, New York, N. Y., a corporation of New York Application April 1, 1937, Serial No. 134,346

8 Claims. (Cl. 295—11)

This invention relates to resilient wheels of the type wherein the hub and tire each have plates radiating therefrom, and elastic elements between the tire plate and each of the hub plates support the hub in resilient shear.

In the most successful type of resilient wheel the springing elements are composed of discs of elastic material each having a disc of metal surface-bonded to opposite faces thereof. The metallic discs transfer all loading from the wheel plates to the rubber and vice versa and are provided with dowels which engage dowel holes in the wheel plates. In view of the practical impossibility of making all of the dowels fit with exactitude in their holes there is danger of shearing one or more of the dowels. It is a principal object of this invention to provide a springing element construction such that the dowels will be relieved of radial loading and therefore will be called upon only to transmit driving or torque loading.

Specifically it is an object to provide a shoulder formation on each metallic disc concentric therewith for accurate fitting into a circular recess in its wheel plate which will have the function of relieving the dowels of radial loading between the wheel hub and the tire. The dowels, then, do not have to fit with the accuracy demanded by present constructions.

When the wheel is operatively assembled it has been necessary to draw the wheel plates toward each other to the extent that the elastic material is subjected to rather severe compression with a consequent bulging at the periphery. A further object of this invention is to provide means for relieving the elastic material of undue stressing at the region of greatest stress,—namely, the inner periphery. A specific object is to form the step, above mentioned, in the region of the inner periphery whereby the springing element is given a greater inner peripheral area.

Other objects and advantages will become hereinafter more fully apparent as reference is had to the accompanying drawing wherein my invention is illustrated and in which, Fig. 1 is a transverse diametric view of a wheel constructed to receive my improved springing element and having the new springing element assembled therewith, and Fig. 2 is an elevation of the springing element.

Fig. 3 is a partial diametric section in separated or "exploded" view for purposes of illustration.

More particularly, 1 indicates a wheel hub having a main plate 2 radiating therefrom and integrally secured thereto. A conical bracing plate 3 is secured to the hub and to the plate 2. Slidable on the hub 1 is a collar 4 having clutch teeth 6 engaging similar teeth 5 on the hub 1 in order that the collar will rotate with the hub. Integrally secured to the collar 4 is a radial plate 7 and a conical bracing plate 8.

Between the plates 2 and 7 is a third plate 9 having an inside opening substantially larger than the outside diameter of the hub 1 and integrally secured to a tire 10. Separating the plates 9 from each main plate 2 and 7 are springing elements each of which consists of a ring of elastic material 11 surface bonded at each face to a disc of metal 12 having a plurality of dowels 13 projecting outwardly for engagement with dowel holes in the plates 2, 7 and 9. These springing elements support the hub from the tire in resilient shear.

The dowels 13 have fitting engagement with their holes sufficiently accurate for driving purposes and in order to maintain engagement between the dowels and their holes substantial pressure is imposed on the elements 11 by the nut 14 which is threaded onto the hub 1 and which abuts the collar 4. The pressure between the discs 12 and their adjacent plates sets up a frictional contact which assists in supporting the radial loading and in transmitting rotational forces.

The discs 12 and the elements 11 are each provided with a step 15 concentric with the peripheries thereof, the step being in the direction to increase the width of the elastic elements at the region of their inner periphery. These steps serve two important functions: first, they provide a very substantial surface to sustain radial loading. They, therefore, have an accurate or driving fit and are made cylindrical or with a taper as indicated by the angle "a."

The second function of these steps 15 is to relieve the elastic material of the rather severe stresses to which it is subjected at its inner periphery due to the pressure imposed for operation. Fig. 3 illustrates this. The element 11 is shown under compression. If the width of the element were constant, the bulging of the inner periphery would be very severe as indicated by the dotted lines 16. A very small crack or check in the periphery would spread rapidly. By distributing the stresses over a greater area 17, the bulging is substantially reduced as indicated by the deformed position 18. If the area of the inner periphery of the element is made substantially equal to that of the outer periphery the stresses will be substantially equal.

What I claim is:

1. A springing element for a shear springing device comprising an elastic ring having substantially parallel sides flared near the inner periphery thereof, the amount of flare being such that the area of the inner and outer peripheral surfaces thereof are substantially equal.

2. A springing element for a shear springing device comprising a ring of elastic material having parallel sides, one of said sides having a step concentric with the inner and outer peripheries thereof thereby providing two thicknesses between said sides.

3. A springing element for a shear springing device comprising a ring of elastic material having parallel sides, both of said sides having a step concentric with the inner periphery thereof and equally spaced therefrom, both of said steps being in the direction to increase the thickness of the ring.

4. A springing element for a rail wheel comprising an elastic ring having substantially parallel faces each stepped concentric with and at equal distances from the inner periphery of said ring, the area of each face radially inward of the steps being substantially less than the area radially outward thereof.

5. A springing element for a rail wheel comprising an elastic ring having substantially parallel faces each stepped concentric with and at equal distances from the inner periphery of said ring, the area of each face radially inward of the steps being substantially less than the area radially outward thereof, and metallic discs having dowels projecting outwardly from one face thereof, surface bonded at their other face to said parallel faces.

6. A resilient wheel comprising a hub, spaced plates radiating from said hub, a tire carrying plate between said spaced plates, and an elastic shear element between said tire carrying plate and each of said spaced plates, said shear elements each having substantially parallel faces flared at the inner periphery thereof, all of said plates being shaped in counterpart of the adjacent faces of said elements.

7. A resilient wheel comprising a hub, spaced plates radiating from said hub, a tire carrying plate between said spaced plates, and an elastic shear element between said tire carrying plate and each of said spaced plates, said shear elements each comprising an elastic ring having a metallic disc surface bonded to opposite faces thereof, said rings and said discs each being stepped near the inner periphery thereof thereby increasing the area of the inner periphery of said rings, the steps being substantially cylindrical and slightly tapered, said plates being stepped substantially in counterpart with the steps on said shear elements and adapted to have a tight fitting engagement therewith.

8. A resilient wheel comprising a hub, spaced plates radiating from said hub, a tire carrying plate between said spaced plates, and an elastic shear element between said tire carrying plate and each of said spaced plates, said shear elements each comprising an elastic ring having a metallic disc surface bonded to opposite faces thereof, said rings and said discs each being stepped near the inner periphery thereof and having dowels projecting outwardly therefrom between the steps and the outer periphery thereof, for engagement with dowel holes in said plates, the steps of said elements constituting means for transmitting radial loading to and from said hub, said dowels constituting means for transmitting torque loading to and from said hub.

CHARLES GORDON.